Nov. 25, 1947.  S. A. SHULER, JR  2,431,589
APPARATUS FOR HANDLING PROPELLERS
Filed Aug. 26, 1946
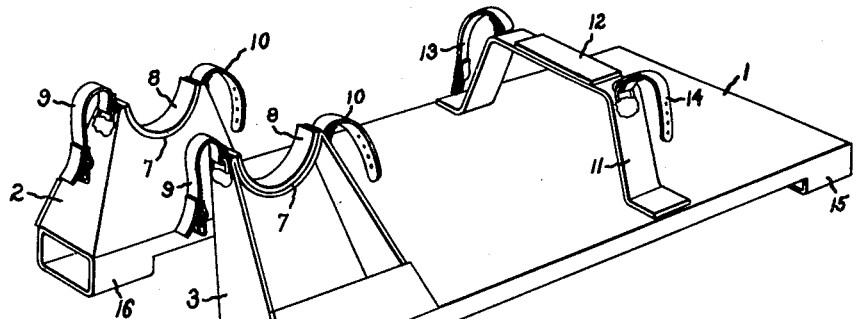
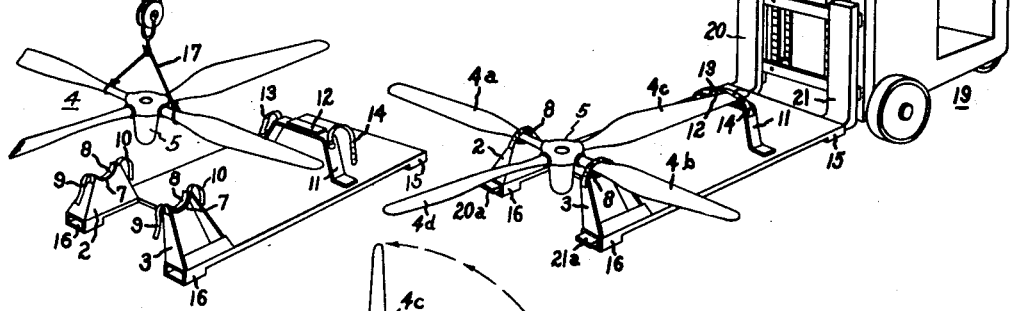
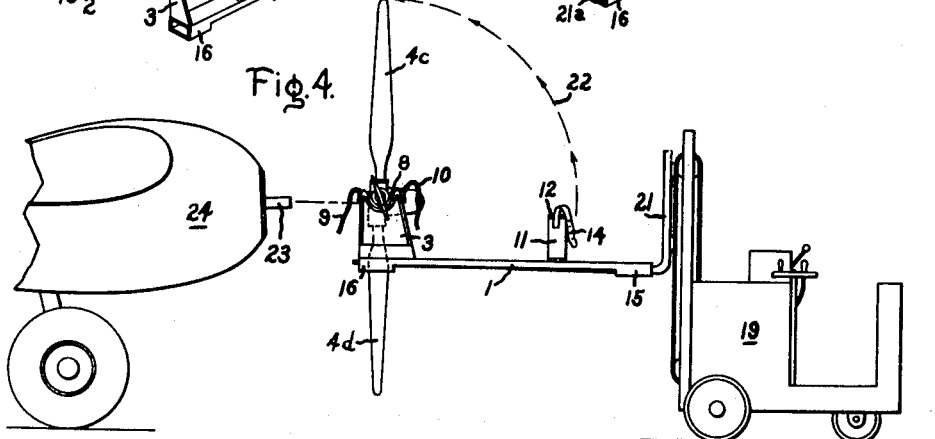
Inventor:
Sanford A. Shuler Jr.
by *Pravell S. Mack*
His Attorney.

Patented Nov. 25, 1947

2,431,589

UNITED STATES PATENT OFFICE 2,431,589

APPARATUS FOR HANDLING PROPELLERS

Sanford A. Shuler, Jr., Schenectady, N. Y., assignor to General Electric Company, a corporation of New York Application August 26, 1946, Serial No. 693,149

8 Claims. (Cl. 214—1)

1

This invention relates to an apparatus for handling aircraft propellers, and is especially adapted for handling large four-bladed propellers.

As the rated power of aircraft powerplants has increased to and above 2000 H. P., the air-screws employed have become increasingly large and heavy. The number of blades has been progressively increased from two to three, and then to four for power ratings in the neighborhood of 2000 H. P. and above. Although five- and six-bladed propellers have sometimes been employed, they become quite heavy and awkward to handle. The four-bladed propeller appears to be a good practical compromise between the aerodynamic requirements and the mechanical limitations. It is particularly desirable that the number of blades should not exceed four in the case of variable pitch propellers where much complex yet reliable mechanism must be contained within a comparatively small space at the hub of the propeller. Furthermore, a four-bladed propeller is much easier to handle than one having an odd number of blades, for instance 3 or 5.

In the past it has been customary to handle such propellers by cable slings suspended from an overhead crane, portable derrick, or similar lifting device. This method is often extremely awkward, particularly when used to install or remove a propeller from a powerplant out-of-doors. In some cases, two extra men may be required merely to hold the propeller steady against the action of the wind.

The object of my invention is to provide a novel cradle especially adapted for supporting a four-bladed propeller which makes possible a convenient method of handling such propellers so as to facilitate their manufacture, and particularly their installation and removal from powerplants mounted in aircraft or in laboratory test stands. The invention is particularly advantageous in saving time in powerplant research and development laboratories where the propeller must be installed and removed at frequent intervals.

Other objects and advantages will be apparent from the following description taken in connection with the accompanying drawings, in which Fig. 1 is a perspective view of a propeller handling cradle in accordance with the invention; while Figs. 2, 3 and 4 illustrate the method of using the cradle of Fig. 1.

Referring more particularly to Fig. 1, it will be seen that my improved cradle consists of a base member 1 which is of elongated configuration, and may conveniently be of rectangular shape. Adjacent the left-hand or "forward" end of the base 1 are a pair of transversely spaced propeller support pedestals 2 and 3, which are substantially vertical and are shaped at their upper ends so as to conveniently engage diametrically opposite blades of a four-bladed propeller. It will be understood by those skilled in the art that such propeller blades are customarily made with root portions which are substantially circular in section adjacent the hub assembly. Therefore, the support pedestals 2, 3 may be provided with arcuate seat members 7, which may have a radius of curvature roughly equal to that of the blade root and may be lined with a suitable material such as felt (or perhaps sponge rubber), as shown at 8, to prevent mechanical injury to the blades or marring of the fine surface finish ordinarily provided on aircraft propeller blades.

Also associated with the upper end portions of the pedestals 2, 3 are suitable quick-releasable fastening means for firmly securing the diametrically opposite propeller blades against the support members 7 during the process of transporting the cradled propeller. These fastenings may conveniently take the form of a two-part belt 9, 10, one portion of which is provided with a suitable buckle or other fastening device.

Secured to the base member 1 rearwardly from the support pedestals 2, 3 is a third support member in the form of a U-shaped bracket 11, the upper horizontal portion of which is provided with a protective pad 12 serving the same function as the pads 8 provided on the pedestals 2, 3. The bracket 11 is likewise provided with quick-detachable securing means which may be a two-part belt 13, 14 similar to the belts 9, 10.

Associated with the base member 1 are means adapted to be engaged by the lifting mechanism of a "lift truck" or other similar ambulatory elevator device. As shown in the drawings, these means may consist of an open ended box structure 15 located at either side of the rearward end of the base, and similar box structures 16 at either side of the base adjacent the forward end thereof. The arrangement and purpose of these structures will be seen more clearly from the description of the method of use described below.

As will be seen from Fig. 1, and more clearly in Fig. 2, the base member 1 is provided with a "cut-out" between the support pedestals 2, 3, the purpose of which will also appear more clearly from the description of the operation below.

It will be apparent to those skilled in the mechanical arts that the cradle shown in Fig. 1 may be readily fabricated by welding ordinary sheet and strip iron.

The manner in which my propeller handling cradle is used will be seen by reference to Figs. 2, 3, 4.

Assuming that the cradle is resting on the ground, the four-bladed propeller, indicated generally at 4, may be lifted and positioned over the cradle by means of a simple cable sling 17 and any suitable block and tackle or equivalent device, represented diagrammatically at 18. Of course, in a factory or service shop there would ordinarily be available an overhead traveling crane or portable derrick to perform this function.

By means of the overhead lifting device 18, the propeller is lowered so that diametrically opposite blades 4a and 4b rest with their hub portions engaging the curved pads 8 associated with the upper end portions of the pedestals 2 and 3 respectively. The third blade 4c projects rearwardly and engages the pad 12 of the bracket 11 in a manner which will be obvious from Fig. 3. With the propeller in this position, the belts 9, 10, 13, 14 may be fastened to secure the respective blades firmly in engagement with the three support members 2, 3, 11.

To transport the cradled propeller, any well-known type of portable elevating device, such as the "fork truck" shown at 19 in Figs. 3 and 4, may be employed. This is provided with two support bars 20, 21 having horizontal portions extending forwardly from the truck and of a length sufficient to extend throughout the length of the base member, projecting through the rearward open-ended box structures 15 and the forward boxes 16. In Fig. 3 these horizontal portions of the lifting members 20, 21 can be seen protruding from the forward boxes 16 at 20a, 21a respectively.

It will be understood that the box structures 15, 16 are of such a size relative to the fork members 20a, 21a that the latter can be readily inserted by causing the truck 19 to approach the cradle from the rear. It will be observed that these box structures also serve as supporting feet when the cradle is resting on the ground.

With the fork members 20a, 21a engaging the base 1 of the cradle as shown in Fig. 3, the elevating mechanism of the lift truck 19 can be actuated to raise the cradle, as indicated in Fig. 4. With the three blades 4a, 4b, 4c of the propeller still secured by the straps, the truck 19 can be moved to a location adjacent the powerplant on which the propeller is to be installed. The straps 13, 14 may now be released from the blade 4c, whereupon the latter may be moved to a substantially vertical position as indicated in Fig. 4 by the arrows 22. It will be apparent that the propeller rotates about the axis of the diametrically opposite blades 4a and 4b, while the fourth blade 4d moves to a vertically downward position within the cut-out defined in the base 1 between the support pedestals 2, 3. The elevating mechanism of the lift truck 19 is now actuated so as to position the propeller hub assembly 5 in proper relation to the propeller drive shaft 23 projecting from the powerplant nacelle 24. The truck 19 may then be moved towards the nacelle 24, so that the propeller hub 5 approaches and engages the drive shaft 23. With the propeller hub 5 supported on the drive shaft 23, the straps 9, 10 may be released and the elevating mechanism of truck 19 actuated to lower the cradle away from the propeller.

It will be obvious that the reverse of the process described above furnishes a method for readily removing the propeller from the drive shaft 23.

With the aid of my invention, only two men are ordinarily required for handling even very large propellers. One drives the truck; while the other rides on the platform formed by the base 1, where he can readily fasten and unfasten the respective blades, raise the propeller to the vertical position, direct the truck driver, and guide the propeller hub into proper engagement with the drive shaft 23.

While the invention is particularly intended for handling four-bladed propellers, it may also be used for two-bladed propellers in a manner which will be obvious from the above description.

As contrasted with the methods heretofore used in handling large aircraft propellers, it has been found that the novel apparatus and method described above effects a very considerable saving in time and trouble, and also reduces the number of workmen required to do the job. It has been shown that a trained crew of two men can, with the aid of my invention, remove a propeller weighing in the neighborhood of 2,000 pounds and install another in a total elapsed time of about ten minutes. Previously, without my invention, the same operation required in the neighborhood of two man-hours of work.

What I claim as new and desire to secure by Letters Patent of the United States, is:

1. A cradle for handling a four-bladed aircraft propeller comprising an elongated base member of a length substantially equal to the tip radius of the propeller, first and second transversely spaced substantially vertical pedestals secured to opposite side portions of the base at the forward end thereof, said pedestals having upper end portions adapted to engage the hub portions of two diametrically opposite blades, a third pedestal secured to the base and spaced rearwardly from the first and second pedestals and having an upper end portion adapted to engage a third blade at a location radially spaced from the hub, said base member defining a cut-out between the first and second pedestals wherein the fourth blade may be positioned vertically downwardly when a propeller is placed with opposite blades engaging said first and second pedestals and the third blade positioned vertically upwardly.

2. A cradle for handling a four-bladed aircraft propeller comprising an elongated base member of a length substantially equal to the tip radius of the propeller, first and second transversely spaced substantially vertical pedestals secured to opposite side portions of the base at the forward end thereof, said pedestals having upper end portions adapted to engage the hub portions of two diametrically opposite blades, a third pedestal secured to the base and spaced rearwardly from the first and second pedestals and having an upper end portion adapted to engage a third blade at a location radially spaced from the hub, quick-releasable means associated with said upper pedestal end portions for securing the respective blades thereto, said base member defining a cut-out between the first and second pedestals wherein the fourth blade is positioned vertically downwardly when said third blade is positioned vertically upwardly to rotate the propeller about the axis of said first two blades.

3. A cradle for handling a four-bladed aircraft propeller comprising an elongated base member of a length substantially equal to the tip radius of the propeller, first and second transversely spaced substantially vertical pedestals secured to opposite side portions of the base at the forward end thereof, said pedestals having upper end portions adapted to engage the hub portions of two diametrically opposite blades, a third pedestal secured to the base and spaced rearwardly from the first and second pedestals and having an upper end portion adapted to engage a third blade at a location radially spaced from the hub, said base member defining a cut-out between the first and second pedestals wherein the fourth blade may be positioned vertically downwardly when a propeller is placed with opposite blades engaging the first and second pedestals and the third blade is moved from the third pedestal vertically upwardly so as to rotate the propeller about the axis of said first two blades, and means associated with the base member adapted to be engaged by the elevating mechanism of a lift truck.

4. A cradle for handling a four-bladed aircraft propeller comprising an elongated base member of a length substantially equal to the tip radius of the propeller, first and second transversely spaced substantially vertical pedestals secured to opposite side portions of the base at the forward end thereof, said pedestals having upper end portions adapted to engage the hub portions of two diametrically opposite blades, a third pedestal secured to the base and spaced rearwardly from the first and second pedestals and having an upper end portion adapted to engage a third blade at a location radially spaced from the hub, quick-releasable means associated with said upper pedestal end portions for securing the respective blades thereto, said base member defining a cut-out between the first and second pedestals wherein the fourth blade is positioned vertically downwardly when the third blade is positioned vertically upwardly so as to rotate the propeller about the axis of the first two blades, and means associated with the base member and adapted to be engaged by the lifting mechanism of a ambulatory elevator device.

5. A cradle for handling a four-bladed aircraft propeller comprising an elongated base member, first and second transversely spaced support means at opposite sides of the base member on the forward end thereof, said support means being adapted to engage two diametrically opposite blades of the propeller adjacent the root portions thereof, a third support on the base member rearwardly from the first and second supports and adapted to engage a third blade at a location radially spaced from the root thereof, the base member being so shaped between the first and second supports that the fourth blade may move to a position substantially vertically downwardly when the opposite blade is moved from said third support to an upright position to cause the propeller to rotate about the axis of said first two blades.

6. A cradle for handling a four-bladed aircraft propeller comprising an elongated base member, first and second transversely spaced support means at opposite sides of the base member on the forward end thereof, said support means being adapted to engage two diametrically opposite blades of the propeller adjacent the root portions thereof, a third support on the base member rearwardly from the first and second supports and adapted to engage a third blade at a location radially spaced from the root thereof, quick-releasable means associated with said support means for securing the respective blades thereto, the base member being so shaped between the first and second supports that the fourth blade may move to a position substantially vertically downwardly when said third blade is moved from said third support to an upright position to cause the propeller to rotate about the axis of said first two blades.

7. A cradle for handling a four-bladed aircraft propeller comprising an elongated base member, first and second transversely spaced support means at opposite sides of the base member on the forward end thereof, said support means being adapted to engage two diametrically opposite blades of the propeller adjacent the root portions thereof, a third support on the base member rearwardly from the first and second supports and adapted to engage a third blade at a location radially spaced from the root thereof, the base member being so shaped between the first and second supports that the fourth blade may move to a position substantially vertically downwardly when the opposite blade is moved from said third support to an upright position so as to cause the propeller to rotate about the axis of said first two blades, and means associated with the base member adapted to be engaged by the lifting mechanism of a portable elevator.

8. A cradle for handling a four-bladed aircraft propeller comprising an elongated base member, first and second transversely spaced support means at opposite sides of the base member on the forward end thereof, said support means being adapted to engage two diametrically opposite blades adjacent the root portions thereof, a third support on the base member rearwardly from the first and second supports and adapted to engage a third blade at a location radially spaced from the root thereof, quick-releasable means associated with said support means for securing the respective blades thereto, the base member being so shaped between the first and second supports that the fourth blade may move to a position substantially vertically downwardly when said third blade is moved from said third support to an upright position to cause the propeller to rotate about the axis of said first two blades, and means associated with the base member adapted to be engaged by the lifting mechanism of an ambulatory elevator device.

SANFORD A. SHULER, Jr.